(12) United States Patent
Araujo et al.

(10) Patent No.: US 9,891,964 B2
(45) Date of Patent: *Feb. 13, 2018

(54) NETWORK TRAFFIC PROCESSING

(71) Applicant: International Business Machines Corporation, Armonk, NY (US)

(72) Inventors: Murilo O. Araujo, Limeira (BR); Leonardo R. Augusto, Campinas (BR); Rafael C. S. Folco, Santa Barbara d'Oeste (BR); Breno H. Leitao, Campinas (BR); Tiago N. Santos, Araraquara (BR)

(73) Assignee: International Business Machines Corporation, Armonk, NY (US)

( * ) Notice: Subject to any disclaimer, the term of this patent is extended or adjusted under 35 U.S.C. 154(b) by 250 days.

This patent is subject to a terminal disclaimer.

(21) Appl. No.: 14/547,173

(22) Filed: Nov. 19, 2014

(65) Prior Publication Data

US 2016/0140070 A1    May 19, 2016

(51) Int. Cl.
*G06F 13/40* (2006.01)
*G06F 9/54* (2006.01)
*G06F 13/42* (2006.01)

(52) U.S. Cl.
CPC .............. *G06F 9/542* (2013.01); *G06F 9/546* (2013.01); *G06F 13/4027* (2013.01); *G06F 13/4221* (2013.01)

(58) Field of Classification Search
CPC .. G06F 13/4027; G06F 13/4221; G06F 9/542; G06F 9/546
See application file for complete search history.

(56) References Cited

U.S. PATENT DOCUMENTS

| 6,950,395 B1 | 9/2005 | Bashandy et al. |
| 7,162,270 B2 | 1/2007 | Chen |

(Continued)

FOREIGN PATENT DOCUMENTS

| GB | 2375933 B | 7/2004 |
| WO | 2005062180 A1 | 7/2005 |

(Continued)

OTHER PUBLICATIONS

Cai, et al., "An Analysis of UDP Traffic Classification", Institute of Computer Technology, printed Sep. 10, 2014, <www.emfield.org/icctadmin/download_paper.php?id=194>.

(Continued)

*Primary Examiner* — Nimesh G Patel
(74) *Attorney, Agent, or Firm* — James H. Mayfield

(57) ABSTRACT

As disclosed herein a method, executed by a computer, for providing improved multi-protocol traffic processing includes receiving a data packet, determining if a big processor is activated, deactivating a little processor and activating the big processor if the big processor is not activated and an overflow queue is full, and deactivating the big processor and activating the little processor if the big processor is activated and a current throughput for the big processor is below a first threshold or a sustained throughput for the big processor remains below a second threshold. The big and little processors may be co-located on a single integrated circuit. An overflow queue, managed with a token bucket algorithm, may be used to enable the little processor to handle short burst of data packet traffic. A computer program product and an apparatus corresponding to the described method are also disclosed herein.

13 Claims, 5 Drawing Sheets

(56) References Cited

U.S. PATENT DOCUMENTS

| | | | |
|---|---|---|---|
| 7,616,573 | B2 | 11/2009 | Olesinski et al. |
| 8,190,298 | B2 | 5/2012 | Roh et al. |
| 8,286,014 | B2 | 10/2012 | Han et al. |
| 8,447,803 | B2 | 5/2013 | Boucher et al. |
| 8,561,078 | B2 | 10/2013 | Sandstrom |
| 8,775,685 | B1 | 7/2014 | Brebner |
| 2003/0095551 | A1* | 5/2003 | Gotoh ............... H04L 47/10 370/395.3 |
| 2004/0215987 | A1* | 10/2004 | Farkas ............... G06F 1/3203 713/300 |
| 2005/0132239 | A1* | 6/2005 | Athas ............... G06F 1/3203 713/300 |
| 2007/0094444 | A1 | 4/2007 | Sutardja |
| 2008/0057896 | A1 | 3/2008 | Kim et al. |
| 2009/0109847 | A1* | 4/2009 | Stephenson ......... H04L 47/10 370/232 |
| 2009/0235050 | A1 | 9/2009 | Raghunath et al. |
| 2010/0115307 | A1 | 5/2010 | Diab |
| 2011/0213993 | A1* | 9/2011 | Greenhalgh ......... G06F 1/3203 713/320 |
| 2011/0292800 | A1* | 12/2011 | Flinta ............... H04L 47/10 370/235 |
| 2012/0155482 | A1 | 6/2012 | Chang et al. |
| 2013/0061237 | A1 | 3/2013 | Zaarur et al. |
| 2013/0286845 | A1* | 10/2013 | Smith, Jr. .......... H04L 43/0894 370/235.1 |
| 2014/0026146 | A1 | 1/2014 | Jahagirdar et al. |
| 2014/0059262 | A1 | 2/2014 | Davis et al. |
| 2014/0189297 | A1 | 7/2014 | Narvaez et al. |
| 2015/0082317 | A1 | 3/2015 | You et al. |
| 2015/0121048 | A1* | 4/2015 | Lukefahr ............ G06F 9/30189 712/229 |

FOREIGN PATENT DOCUMENTS

| | | |
|---|---|---|
| WO | 2009004628 A2 | 1/2009 |
| WO | 2009029643 A2 | 3/2009 |
| WO | 2011026084 A1 | 3/2011 |
| WO | 2011107777 A1 | 9/2011 |
| WO | 2013095664 A1 | 6/2013 |

OTHER PUBLICATIONS

Gebali, et al., "Networks-on-Chips: Theory and Practice", Mar. 25, 2009, CRC Press, 38 pages, Taylor & Francis Group, Boca Raton, FL, ISBN-10: 1420079786.

Huang, et al., The Qos-aware Order Prediction Scheduling (QOPS) Scheme for Video Streaming Using the Multi-path Datagram Congestion Control Protocol (MP-DCCP), 2012 15th International Conference on Network-Based Informational Systems, pp. 276-283, © 2012 IEEE, <http://ieeexplore.ieee.org/xpl/articleDetails.jsp?arnumber=6354838>.

Kohler, et al., "Datagram Congestion Control Protocol (DCCP)", RFC 4340, Mar. 2006, <https://tools.ietf.org/html/rfc4340>.

Kornaros, Georgios, "Multi-Core Embedded Systems", 2010, 23 Pages, CRC Press, Taylor & Francis Group, Boca Raton, FL, ISBN: 978-1-4398-1161-0.

Li, et al., "A token bucket method for packet injection control in deflection-routed optical networks", 15th OptoElectronics and Communications Conference (OECC2010) Technical Digest, Jul. 2010, Sapporo Convention Center, Japan, pp. 578-579, <http://www.researchgate.net/publication/224178591_A_token_bucket_method_for_packet_injection_control_in_deflection-routed_optical_networks>.

Shang, et al., "Dynamic Voltage Scaling with Links for Power Optimization of Interconnection Networks", The Ninth International Symposium on High-Performance Computer Architecture, 2003, HPCA-9 2003, Proceedings, Feb. 8-12, 2003, pp. 91-102, DOI: 10, 1109/HPCA, 2003, 1183527.

Sohan, et al., "Characterizing 10 Gbps Network Interface Energy Consumption", 2010 IEEE 35th Conference on Local Computer Networks (LCN), 2010, pp. 268-271, DOI: 10, 1109/LCN, 2010 5735719.

Van Craeynest, et al., Scheduling Heterogeneous Multi-Cores through Performance Impact Estimation (PIE), 39th Annual International Symposium on Computer Architecture (ISCA), Jun. 9-13, 2012, pp. 213-224.

Vukovic, Alex, "Communication Network Power Efficiency Assessment, Limitations and Directions", Electronics Cooling, Issue Aug. 2004, <http://www.electronics-cooling.com/2004/08/communication-network-power-efficiency-assessment-limitations-and-directions/>.

Xie, et al., "Three-Dimensional Network-on-Chip Architecture", Chapter 8, © Springer Science+Business Media, LLC 2010, pp. 189-217, DOI: 10, 1007/978-1-4419-0784-4_8.

Yang, et al., "Adaptive Power Saving Strategy Based on Traffic Load in the IEEE 802.16e Network", Proceedings, International Conference on Information and Communication Technologies (ICICT 2010), May 26-28, 2010, Tokyo, Japan.

Yu, Zhiyi, "Towards High-Performance and Energy-Efficient Multicore Processors", Chapter 2, Analog Circuits and Signal Processing, 2010, pp. 29-51, vol. 382, © Springer Science+Business Media B.V. 2010.

Arm, "The Architecture for the Digital World", accessed May 20, 2013, 5 pages, <http://www.arm.com/products/processors/technologies/bigLITTLEprocessing.php>.

"NVIDIA's Next Generation Notebook Technology: Optimus", NVIDIA Whitepaper, V1.0, accessed May 20, 2013, 24 pages, <http://www.nvidia.com/object/LO_optimus_whitepapers.htm>.

"ARM big.LITTLE", From Wikipedia, the free encyclopedia, last modified on Sep. 7, 2014, <http://en.wikipedia.org/wiki/ARM_big.LITTLE>.

"Datagram Congestion Control Protocol", From Wikipedia, the free encyclopedia, last modified on Jul. 31, 2013, <https://en.wikipedia.org/wiki/Datagram_Congestion_Control_Protocol>.

"Network on a chip", From Wikipedia, the free encyclopedia, last modified on Oct. 21, 2013, <http://en.wikipedia.org/wiki/Network_on_a_chip>.

"Token bucket", From Wikipedia, the free encyclopedia, last modified on Apr. 8, 2014, <http://en.wikipedia.org/wiki/Token_bucket>.

"Network Traffic Processing", U.S. Appl. No. 14/566,739, filed Dec. 11, 2014.

IBM Appendix P, list of IBM patents or patent applications treated as related, Dec. 11, 2014.

\* cited by examiner

NETWORK TRAFFIC PROCESSING

BACKGROUND OF THE INVENTION

The present invention relates generally to the field of integrated circuits, and more particularly to energy conservation when processing network traffic.

Performance coupled with energy consumption and efficiency are important topics when considering a network traffic processing architecture. big.LITTLE™ is a System-on-Chip (SoC) architecture that combines the usage of a pair of processors on a single chip. The larger processor (i.e., big) is a powerful processor for handling high peaks and high volume traffic. The second, a smaller processor (i.e., LITTLE), is a lower power processor for processing lower volume traffic. When the SoC is performing networking operations, the integrated circuit may also be referred to as a Network-on-a-Chip (NoC). What is needed are methods for switching between the larger and smaller processors that conserves energy, particularly when processing variable network traffic.

SUMMARY

As disclosed herein a method, executed by a computer, for providing improved multi-protocol traffic processing includes receiving a data packet, determining if a big processor is activated, deactivating a little processor and activating the big processor if the big processor is not activated and an overflow queue is full, and deactivating the big processor and activating the little processor if the big processor is activated and a current throughput for the big processor is below a first threshold or a sustained throughput for the big processor remains below a second threshold. The big and little processors may be co-located on a single integrated circuit, and part of a NoC architecture. An overflow queue, managed with a token bucket algorithm, may be used to enable the little processor to handle short bursts of data packet traffic. A computer program product and an apparatus corresponding to the described method are also disclosed herein.

DETAILED DESCRIPTION

When considering current networking architecture, there is often a trade-off between energy conservation and performance. When a Network-on-a-Chip (NoC) architecture is used, two processors are often co-located on a single integrated circuit for handling network data packets. Network utilization along with the rate at which data packets arrive determine which of the two processors is activated; a larger (i.e., higher performance and higher energy consuming) processor or a smaller (i.e., lower performance and more energy efficient) processor. Current technology relies on predictive algorithms to determine when a switch between the large and little processors may be advantageous. It has been observed that during fluctuations in network utilization there may be unnecessary switches between the two processors, compromising energy efficiency and performance. The embodiments disclosed herein provide a network traffic processing method that reduces unnecessary switches between the two processors on the NoC.

Figure 1:
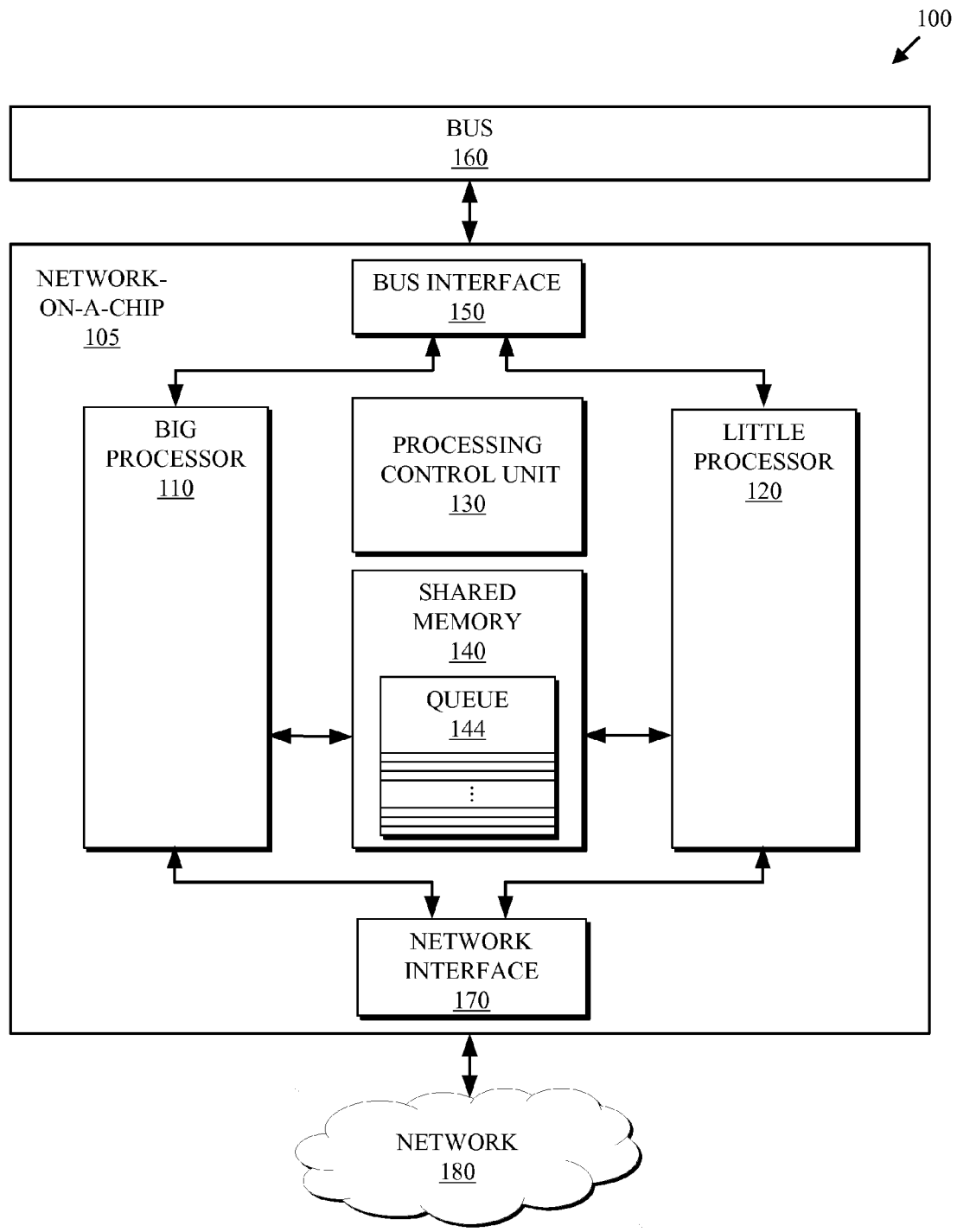
FIG. 1 is a functional block diagram of one embodiment of network interface system in which at least some of the embodiments disclosed herein may be deployed.

FIG. 1 is a functional block diagram of one embodiment of a network interface system 100. As depicted, the network interface system 100 includes a Network-on-a-Chip 105, a big processor 110, a little processor 120, a processing control unit 130, shared memory 140, an overflow queue 144, a bus interface 150, a bus 160, a network interface 170, and a network 180. The network interface system 100 is one example of an environment in which at least some of the embodiments disclosed herein may be deployed.

The Network-on-a-Chip 105 is an integrated circuit that may contain a big processor 110, a little processor 120, a processing control unit 130, shared memory 140, an overflow queue 144, a bus interface 150, a network interface 170, and the like. A big processor 110 and little processor 120 may be network processors, co-located on a single integrated circuit, capable of handling a data packet. A data packet may be received from the network 180 via the network interface 170. The network 180 may be a local area network (LAN), a wide area network (WAN), or a combination of the two, and can include wired, wireless, or fiber optic connections. Alternatively, the data packet may have been received via the bus 160 and bus interface 150.

The processing control unit 130 may manage the operation of the big processor 110 and the little processor 120. The processing control unit 130 may also control the shared memory 140 as well as the computer's arithmetic operations, logic operations and interval timers. In one embodiment, the processing control unit 130 detects a high volume of network traffic, and as a result, activates the big processor and deactivates the little processor. Alternatively, when the network traffic subsides, the processing control unit 130 activates the little processor and deactivates the big processor.

The shared memory 140 may be accessible by the big processor 110 and the little processor 120. The shared memory 140 may contain an overflow queue 144. If the rate of data packet arrival is greater than what can be processed, the data packet may be placed on the overflow queue 144 and remain on the overflow queue 144 until either the big processor 110 or the little processor 120 is able to process the data packet.

In one example, a user may be using FTP to send a file over a network from one computer to a community server. The receiving computer is simultaneously receiving data from multiple users, and initially is able to handle the network traffic using the little processor, but eventually has to switch to the big processor to keep up with the incoming data. In another example, a user sends an email to a colleague. The email is sent using email protocols (e.g., POP, IMAP, and SMTP). The little processor is able to handle the data packets corresponding to the email without activating the big processor.

Figure 2:
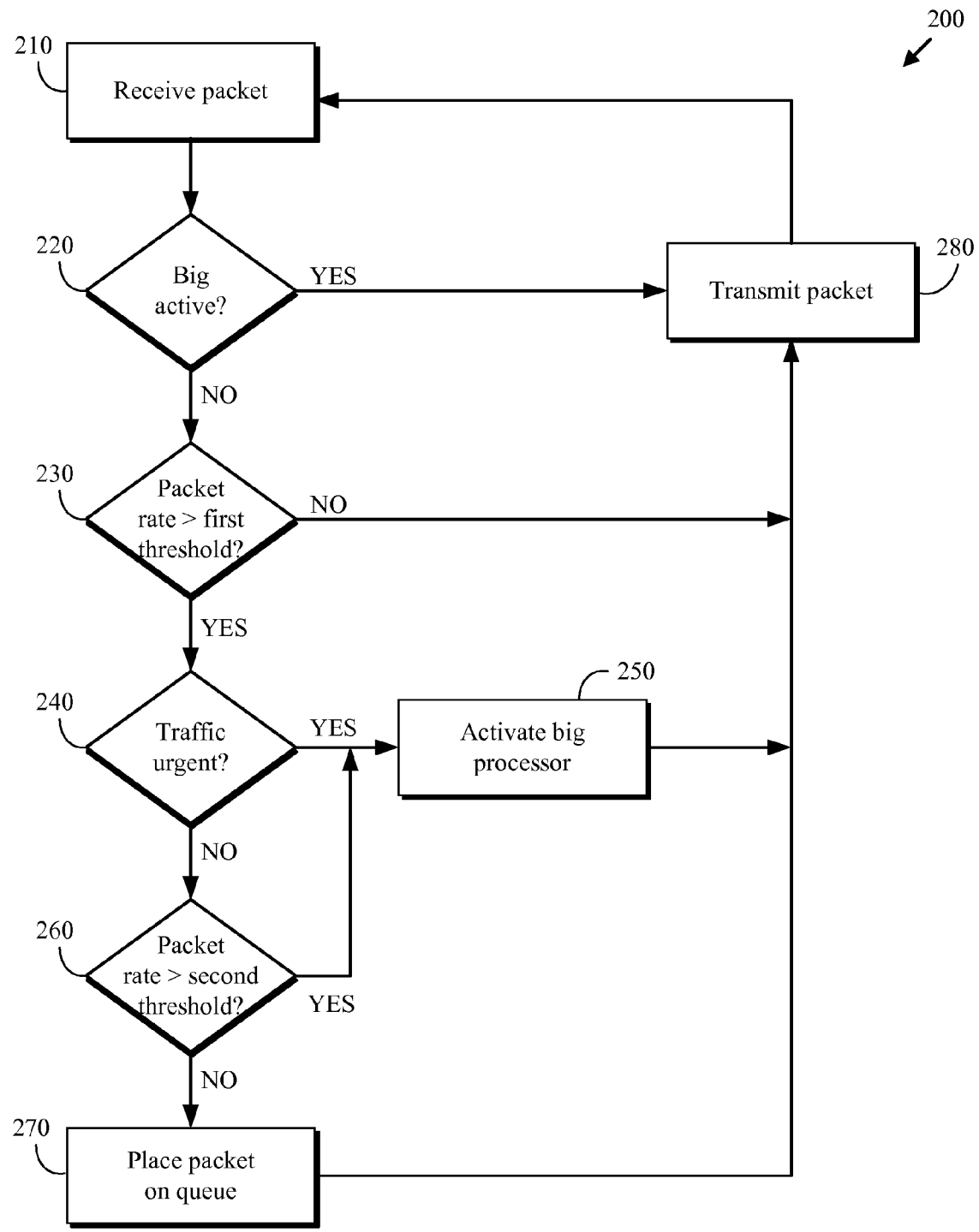
FIG. 2 is a flowchart depicting one embodiment of a data packet processing method.

FIG. 2 is a flowchart depicting one embodiment of a data packet processing method 200. As depicted, data packet processing method 200 includes receiving (210) a data packet, determining (220) whether a big processor is active, determining (230) whether a data packet arrival rate is greater than a first threshold, determining (240) whether the current data packet is urgent, activating (250) the big processor and deactivating the little processor, determining (260) whether the a data packet arrival rate is greater than a second threshold, placing (270) the data packet on the overflow queue, and transmitting (280) the data packet. The data packet processing method 200 may be a continuously running operation that enables a network interface to receive a data packet and transmit the packet to a destination.

Receiving (210) a data packet may include a data packet arriving on the NoC. The data packet may arrive from the network, such as a local area network (LAN) or a wide area network (WAN). Alternatively, the data packet may arrive from the bus via the bus interface. Supported packet based protocols may include TCP/IP, IPX, UDP, or the like.

Determining (220) whether a big processor is active may include confirming if the big processor is currently enabled. In one embodiment, a flag is checked to determine if the big processor is currently active. In another embodiment, an internal register is checked to discover if the big processor is currently active. If the big processor is currently active, the method 200 proceeds to the transmit operation 280. Otherwise, the method proceeds to determining (230) whether a data packet arrival rate is greater than a first threshold.

Determining (230) whether a data packet arrival rate is greater than a first threshold may include comparing the current data packet arrival rate with a first threshold value. The first threshold value may be a predetermined system utilization percentage. In one embodiment, the first threshold corresponds to the maximum throughput capability of the little processor. In another embodiment, the first threshold corresponds to a percentage of the maximum throughput capability of the little processor (e.g., 95%). If the rate of data packet arrival is greater than the first threshold, the method 200 proceeds to the determining (240) whether the current data packet is urgent. Otherwise, the method proceeds to the transmit operation 280.

Determining (240) whether the current data packet is urgent may include confirming if the originator of the data packet identified the contents of the data packet as an urgent data packet (i.e., low-latency data). In one embodiment, there may be a flag within the data packet header that identifies the contents of the packet as urgent data. For example, a user may be streaming live video which requires low-latency. At the same time, the user may be downloading a file from a webpage. The live video may require minimal delay, while the download of the file may not be affected by delays. If the current data packet is urgent, the method 200 proceeds to the big processor activation operation 250. Otherwise, the method proceeds to determine whether the data packet arrival rate is greater than a second threshold 260.

Activating (250) the big processor and deactivating the little processor may include enabling the big processor to begin processing data packets. This may also include disabling the little processor. Once enabled, the big processor may initially process any urgent data packets. The big processor may also process any packets that are contained in the overflow queue, and subsequently proceed with processing the incoming data packets.

Determining (260) whether a data packet arrival rate is greater than a second threshold may include comparing the current data packet arrival rate with a second threshold value. The second threshold value may be predetermined based on the maximum throughput of the little processor with an overflow queue, over a selected time interval. Alternatively, the second threshold may also be expressed in terms of a utilization percentage over a selected time interval. For example, the second threshold may be calculated using the total capacity of an overflow queue and the maximum throughput capability of the little processor divided by a selected time interval. The selected time interval may correspond to an interrupt rate for a packet processing routine or a latency for a maximum sized packet.

The overflow queue contents are referenced using a queue index. The queue index may be managed by a token bucket algorithm, where one token is available for each slot in the queue. The token bucket size (i.e., number of tokens) may be dependent on the available shared memory on the integrated circuit. If the rate of data packet arrival is greater than the second threshold, the method 200 proceeds to the big processor activation operation 250. Otherwise, the method proceeds to the queue operation 270.

Placing (270) the data packet in the overflow queue may include obtaining a token ID from a token bucket and placing the data packet in an overflow queue at a location corresponding to the token. The data packet will be held in the overflow queue until a processor is available. Each time a data packet is placed on the overflow queue, a token is removed from the token bucket (e.g., t−−, where t may be a token ID (i.e., counter) representing the number of unused tokens available in the bucket). If the token counter reaches zero, the overflow queue is full. Each time a data packet is removed from the overflow queue, the token counter is incremented (e.g., t++), indicating additional available space in the overflow queue.

Transmitting (280) the data packet may include either the big processor or the little processor processing a data packet and sending the data packet to a destination. In one embodiment, the destination is another computer on a network such as an intranet or internetwork using wired, wireless, or fiber optic connections. In another embodiment, the destination is the current host of the network interface and the data packet is delivered via the internal bus interface and the bus.

Figure 3:
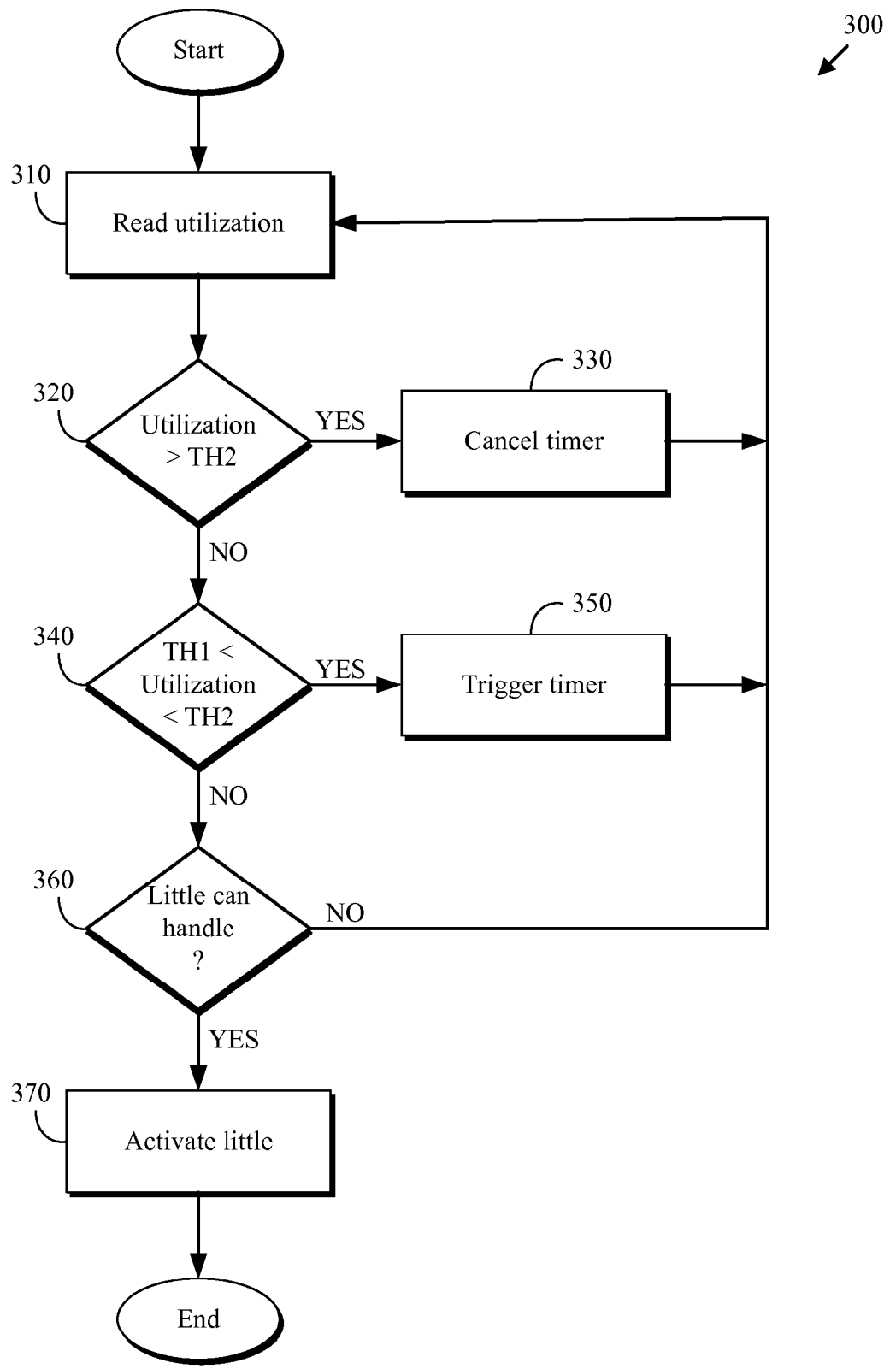
FIG. 3 is a flowchart depicting one embodiment of a network utilization monitoring method.

FIG. 3 is a flowchart depicting one embodiment of a network utilization monitoring method 300. As depicted, the network utilization monitoring method 300 includes reading (310) the current system network utilization, determining (320) whether current utilization is greater than a second threshold, cancelling (330) a timer, determining (340) whether the utilization is between a first threshold and a second threshold, triggering (350) a timer, determining (360) whether the little processor can handle the data packet traffic, and activating (370) the little processor. The network utilization monitoring method 300 is a process that may be enabled when the big processor is activated. The method may be iteratively invoked on a preconfigured schedule until the big processor is deactivated. The method enables the NoC to monitor system network utilization and determine when switching to the little processor may be advantageous.

Reading (310) the current system network utilization may include using system commands to query current system utilization. Those of skill in the art will appreciate that there are numerous different architecture and software configurations; thus, there are many ways to determine system network utilization. In one embodiment, a network analysis application is used to determine the current system network utilization. In another embodiment, in a unix environment, a system command such as netstat are used to monitor network traffic and calculate current system network utilization.

Determining (320) whether current utilization is greater than a second threshold may include comparing the current throughput (i.e., current utilization) with a second threshold. The second threshold may be a predetermined utilization percentage. For example, the second threshold may be calculated using the maximum throughput of the little processor plus the size of the overflow queue divided by a selected time interval. If the current utilization is greater than the second threshold, indicating that the current data packet traffic may overrun the little processor, the method 300 proceeds to the cancel timer operation 330. Otherwise, the method proceeds to determine whether the utilization is between a first threshold and a second threshold operation 340.

Cancelling (330) a timer may include determining if an interval timer is currently in use. If an interval timer is in use, the interval timer will be cancelled, preventing the interval timer from running to completion. A cancelled interval timer may indicate the utilization rose above the second threshold prior to the utilization timer running to completion. A lapsed utilization timer may indicate the interval passed without the utilization rising above the second threshold. In one embodiment, the current interval timer is cancelled, and an indicator is set to indicate the timer was cancelled and did not lapse normally.

Determining (340) whether the utilization is between a first threshold and a second threshold may include comparing the current throughput (i.e., current utilization) with a first threshold and comparing the current utilization with a second threshold. If the current utilization is between the first threshold and the second threshold (i.e., first threshold<current utilization<second threshold), the method 300 proceeds to the trigger a timer operation 350. Otherwise, the method proceeds to determine (360) if the little processor can handle the data packet traffic.

Triggering (350) a timer may include starting a timer that is used to identify the beginning and end of an interval over which the system network utilization will be monitored. A timer may be controlled by the processing control unit contained on the NoC. In one embodiment, the timer is a countdown timer, and a lapsed countdown timer (i.e., a timer that has run to completion) indicates the system utilization has not risen above the second threshold during the timer interval. When a timer runs to completion, an indicator may be set to signal the timer completed normally. A cancelled timer may indicate the utilization rose above the second threshold prior to the timer lapsing.

Determining (360) whether the little processor can handle the data packet traffic may include verifying the current utilization is below a first threshold. The first threshold value may be a predetermined system utilization percentage. Additionally the little processor may be able to handle the data packet traffic if an interval timer has lapsed without being cancelled. A lapsed interval timer indicates the utilization has been at a sustained level between the second threshold and the first threshold, and the data packet traffic may be handled by the little processor in conjunction with the overflow queue. If the little processor can handle the data packet traffic the method 300 proceeds to activating (370) the little processor. Otherwise, the method iterates to the read utilization operation 310.

Activating (370) the little processor may include enabling the little processor to begin processing data packets. The operation may also include deactivating the big processor. Once enabled, the little processor may begin processing the incoming data packets. If the data packet arrival rate is greater than the maximum throughput of the little processor, a token bucket algorithm may be used to place the overflow data in the overflow queue. After the little processor is activated, the network utilization monitoring method 300 may terminate.

Figure 4:
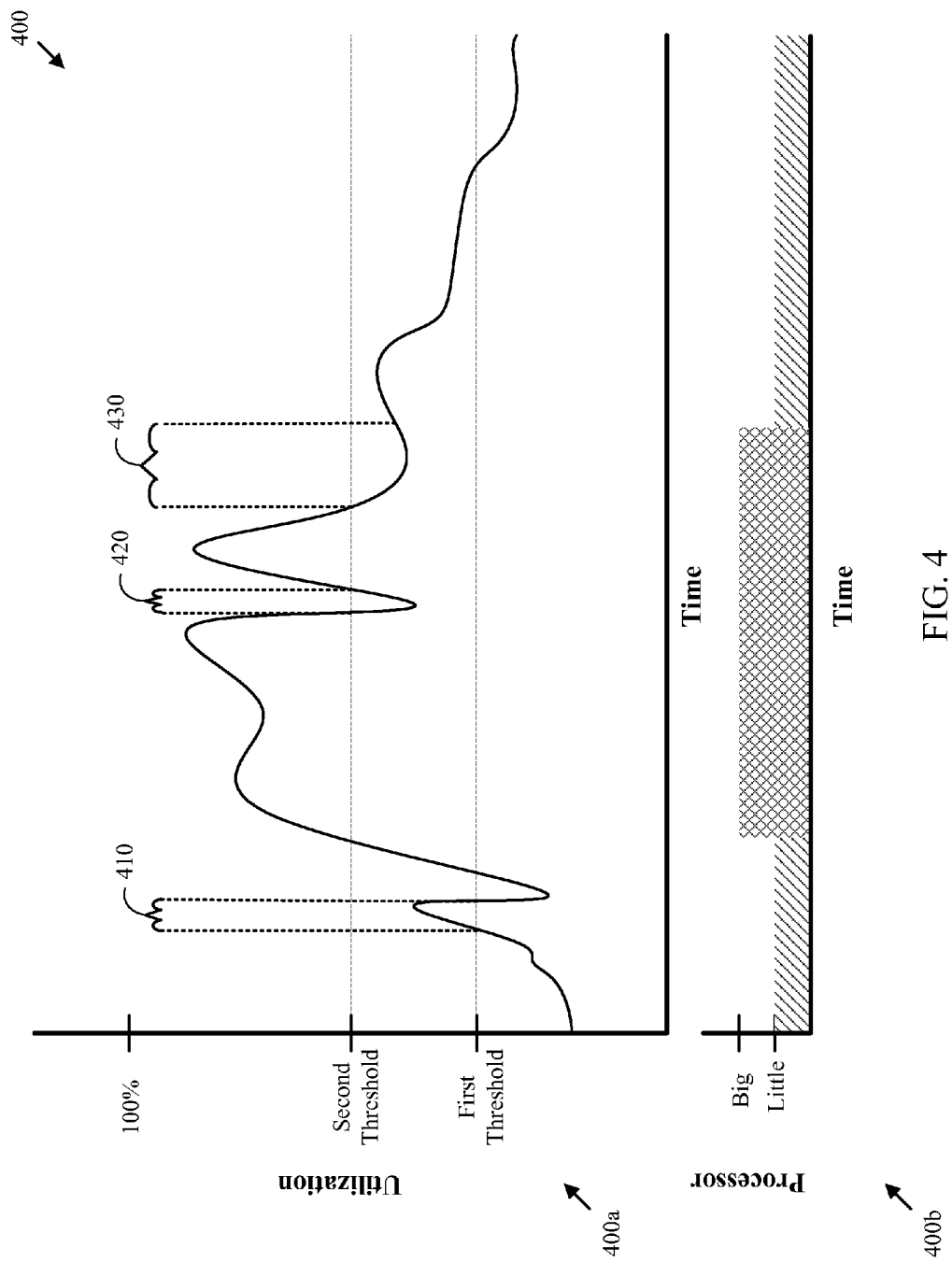
FIG. 4 is a diagram illustrating a specific example of network traffic processing with two processors.

FIG. 4 is a diagram illustrating a specific example of network traffic processing with two processors 400. As depicted, text diagram 400 consists of graphs 400a and 400b. Graph 400a plots data packet arrival rate in terms of potential system utilization over time. Graph 400b identifies whether the little or big processor is active over the same time interval referenced in graph 400a.

There are two thresholds identified on graph 400a. The first threshold may be the maximum throughput capability of the little processor. Alternatively the first threshold may be a percentage of maximum throughput capability of the little processor (e.g., 95%). The second threshold may be calculated using the maximum throughput of the little processor plus the size of the overflow queue divided by a selected time interval. The resulting second threshold is the maximum number of data packets that may be handled by the little processor and the overflow queue over a selected time interval.

Also identified on graph 400a are three intervals (410, 420, and 430) denoting different scenarios. Interval 410 depicts a scenario in which the data packet arrival rate experiences a spike that is greater than the first threshold and less than the second threshold. The spike in data packet arrival is for a short duration, and can be handled by the little processor by using the overflow queue. As is displayed in graph 400b, the little processor handles the data packet traffic without activating the big processor.

Interval 420 depicts a scenario in which the data packet arrival rate experiences a lull that is less than the second threshold and greater than the first threshold. The lull in data packet arrival is for a short duration. The duration may have been shorter than a predetermined interval, and therefore a switch to the little processor was not requested. As is displayed in graph 400b, the big processor remains active throughout the short lull.

Interval 430 depicts a scenario in which the data packet arrival rate experiences a lull that is less than the second threshold and greater than the first threshold. The sustained throughput remains in the range between the second threshold and the first threshold over a duration that is equal to, or greater than, a predetermined interval 430. Sustained throughput in this range may indicate the data packet traffic can be handled by the little processor and the overflow queue; thus, the little processor is activated and the big processor is deactivated. Graph 400b depicts the switch from the big processor to the little processor at the end of the interval 430.

Figure 5:
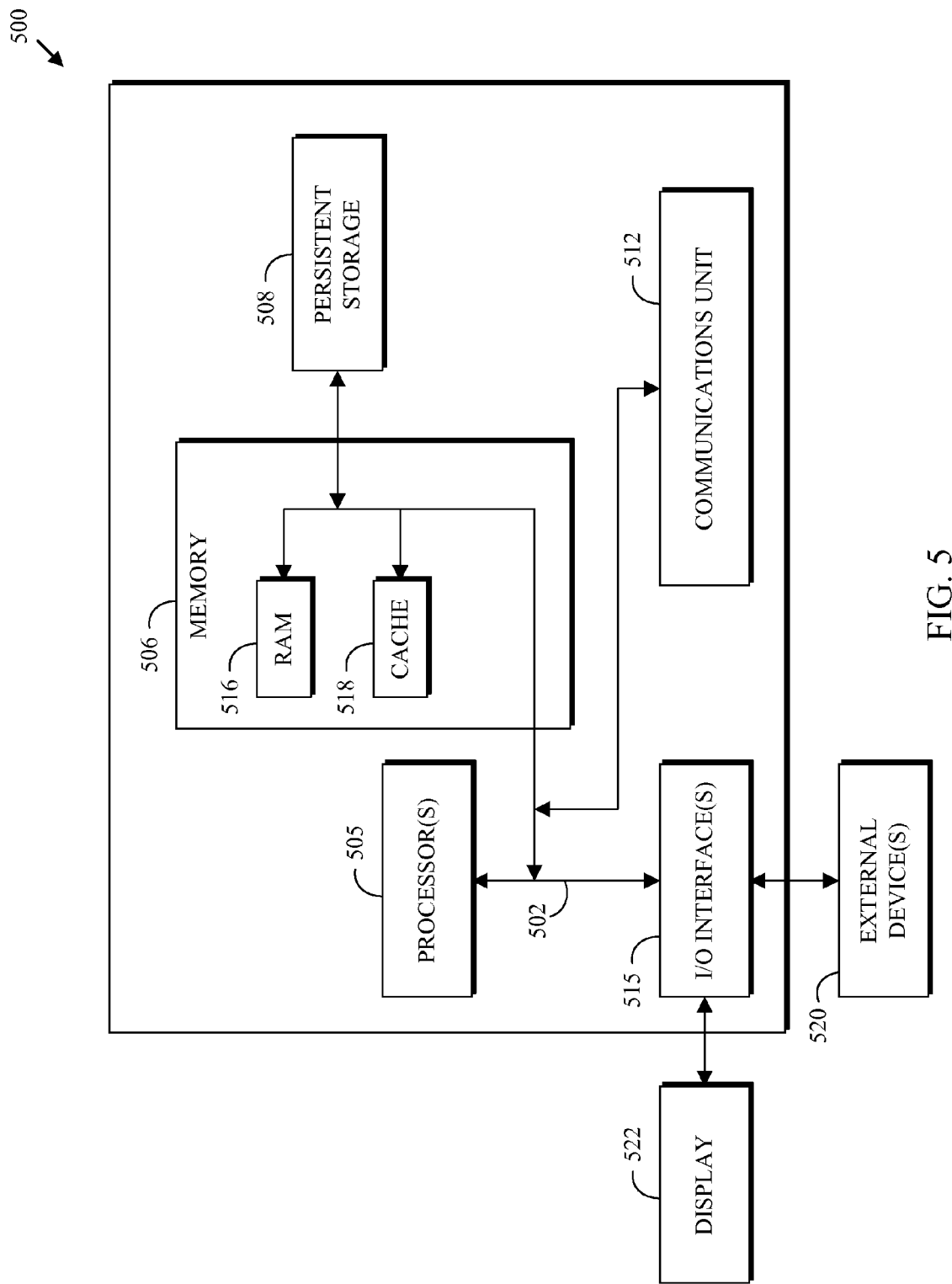
FIG. 5 is a block diagram depicting various components of one embodiment of a computer suitable for executing the methods disclosed herein.

FIG. 5 is a block diagram depicting one example of a computing apparatus (i.e., computer) suitable for executing the methods disclosed herein. The computer 500 may contain one or more embodiments of the NoC depicted in FIG. 1. It should be appreciated that FIG. 5 provides only an illustration of one implementation and does not imply any limitations with regard to the environments in which different embodiments may be implemented. Many modifications to the depicted environment may be made.

As depicted, the computer 500 includes communications fabric 502, which provides communications between computer processor(s) 505, memory 506, persistent storage 508, communications unit 512, and input/output (I/O) interface(s) 515. Communications fabric 502 can be implemented with any architecture designed for passing data and/or control information between processors (such as microprocessors, communications and network processors, etc.), system memory, peripheral devices, and any other hardware components within a system. For example, communications fabric 502 can be implemented with one or more buses.

Memory 506 and persistent storage 508 are computer readable storage media. In this embodiment, memory 506 includes random access memory (RAM) 516 and cache memory 518. In general, memory 506 can include any suitable volatile or non-volatile computer readable storage media.

One or more programs may be stored in persistent storage 508 for execution by one or more of the respective computer processors 505 via one or more memories of memory 506. The persistent storage 508 may be a magnetic hard disk drive, a solid state hard drive, a semiconductor storage device, read-only memory (ROM), erasable programmable read-only memory (EPROM), flash memory, or any other computer readable storage media that is capable of storing program instructions or digital information.

The media used by persistent storage 508 may also be removable. For example, a removable hard drive may be used for persistent storage 508. Other examples include optical and magnetic disks, thumb drives, and smart cards that are inserted into a drive for transfer onto another computer readable storage medium that is also part of persistent storage 508.

Communications unit 512, in these examples, provides for communications with other data processing systems or devices. In these examples, communications unit 512 includes one or more network interface cards. Communications unit 512 may provide communications through the use of either or both physical and wireless communications links.

I/O interface(s) 515 allows for input and output of data with other devices that may be connected to computer 500. For example, I/O interface 515 may provide a connection to external devices 520 such as a keyboard, keypad, a touch screen, and/or some other suitable input device. External devices 520 can also include portable computer readable storage media such as, for example, thumb drives, portable optical or magnetic disks, and memory cards.

Software and data used to practice embodiments of the present invention can be stored on such portable computer readable storage media and can be loaded onto persistent storage 508 via I/O interface(s) 515. I/O interface(s) 515 also connects to a display 522. Display 522 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowcharts and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer program product for conducting network traffic processing, the computer program product comprising:
one or more computer readable storage media and program instructions stored on the one or more computer readable storage media, the program instructions comprising instructions to:
receive a data packet;
determine if a big processor is activated;
deactivate a little processor and activate the big processor if the big processor is not activated and an overflow queue is full;
deactivate the big processor and activate the little processor if the big processor is activated and a current throughput for the big processor is below a first threshold; and
deactivate the big processor and activate the little processor if the big processor is activated and a sustained throughput for the big processor remains below a second threshold, wherein the first threshold corresponds to a higher throughput than the second threshold.

2. The computer program product of claim 1, wherein the little processor and big processor are co-located on a single integrated circuit.

3. The computer program product of claim 1, wherein the program instructions comprise instructions to manage an overflow queue index with a token bucket algorithm.

4. The computer program product of claim 3, wherein a token bucket size corresponds to available shared memory for the big processor and the little processor.

5. The computer program product of claim 1, wherein an urgent data packet is not placed in the overflow queue.

6. The computer program product of claim 1, wherein the first threshold corresponds to a maximum throughput of the little processor.

7. The computer program product of claim 1, wherein the second threshold corresponds to a maximum throughput of the little processor plus a size of the overflow queue divided by a selected time interval.

8. An apparatus for processing network traffic, the apparatus comprising:
a network interface configured to receive a data packet;
a big processor configured to process network traffic at a first rate;
a little processor configured to process network traffic at a second rate that is lower than the first rate;
a processing control unit configured to determine if the big processor is activated;
the processing control unit further configured to deactivate the little processor and activate the big processor if the big processor is not activated and an overflow queue for the little processor is full; and
the processing control unit further configured to deactivate the big processor and activate the little processor if the big processor is activated and a current throughput for the big processor is below a first threshold and to deactivate the big processor and activate the little processor if the big processor is activated and a sustained throughput for the big processor remains below a second threshold, wherein the first threshold corresponds to a higher throughput than the second threshold.

9. The apparatus of claim 8, wherein the processing control unit is further configured to manage a queue index for the overflow queue with a token bucket algorithm.

10. The apparatus of claim 9, wherein a token bucket size corresponds to available shared memory for the big processor and the little processor.

11. The apparatus of claim 8, wherein an urgent data packet is not placed in the overflow queue.

12. The apparatus of claim 8, wherein the first threshold is corresponds to a maximum throughput of the little processor.

13. The apparatus of claim 8, wherein the second threshold corresponds to a maximum throughput of the little processor plus a size of the overflow queue divided by a selected time interval.

* * * * *